Patented July 18, 1933

1,918,595

UNITED STATES PATENT OFFICE

FELIX M. FREDERIKSEN, OF MILWAUKEE, WISCONSIN, ASSIGNOR, BY MESNE ASSIGNMENTS, TO PREMIER-PABST CORPORATION, A CORPORATION OF DELAWARE

CHEESE PRODUCT AND PROCESS OF MAKING THE SAME

No Drawing.   Application filed May 17, 1930.   Serial No. 453,418.

This invention relates to a process of making cheese and the produce which is obtained thereby.

In United States Letters Patent No. 1,634,410, dated July 5, 1927, to Elmer E. Eldredge, a cheese product and method of making the same is described which involves the addition of whey or whey concentrate to ground, cured cheese and the pasteurization of the same. The product thus formed is better than the usual so-called "processed cheese" as the whey and whey concentrate improve the keeping qualities of the cheese and form combinations of pleasing taste but in some instances using only whey or whey concentrate alone with the cheese does not give the texture demanded by the consumer.

I have found casein, in some forms, to be very adaptable for the correction of texture conditions. On account of its physical and chemical properties it is a most valuable asset in the manufacture of cheese products. Its neutral behavior at its isoelectric point and its tendency to form salts when either on the alkaline or acid side permit of changing conditions to suit the purpose, bringing about different results without materially altering the composition of the mixture. It will improve the body of such food mixtures to an extent so that they will meet the demands for texture and for keeping qualities.

Cheese itself, of course, contains casein, but if this were added in greater percentage to the product of the Eldredge patent above mentioned it would improve the texture but it would have the decided disadvantage of reducing those constituents which are deemed necessary and beneficial to the consumer, viz: milk sugar, milk proteins, milk minerals, lactates and vitamines.

I have experimented with cheese products containing casein in a semi-soluble colloidal form, viz: with condensed skim-milk and skim-milk powder as well as with condensed whole milk and whole milk powder in conjunction with whey in any shape or form. Whenever it is desirable to cut the sweetness of the whey in making a cheese product of the type of the above-mentioned patent, I use skim-milk in either form and when it is desirable to increase the fat content of the mixture condensed whole milk or whole milk powder is used.

In carrying out my invention I take whey and neutralize it by the use of caustic soda or other alkaline salts and concentrate it so as to be of a pasty consistency when cold and in such condition it may have a moisture content of thirty to fifty percent. This concentrate is mixed, as by stirring, with ground cheese and so much of the condensed skim-milk or skim-milk powder as is considered necessary to cut the sweetness of the whey and improve the texture of the finished product and in case the fat content is to be increased, condensed whole milk or whole milk powder is used instead of the condensed skim-milk or skim-milk powder in the desired proportion to increase the fat content and cut the sweetness of the whey and improve the texture of the finished product. The combination of whey, ground cheese and casein in the semi-soluble colloidal form of skim-milk, either in condensed or powder form, or whole milk, either in condensed or powder form, is, after mixing, stabilized or pasteurized in any of the well known ways, preferably while being stirred, to form a cheese product having a homogeneous texture which will keep indefinitely or for long periods, under ordinary climatic temperatures, and is then packaged for market, generally in hermetically-sealed containers or in sealed, tin-foil covering in any of the well-known ways.

The concentrate and semi-soluble colloidal casein are preferably added to the ground cheese to form a mixture of about ninety per cent ground cheese and ten per cent of the concentrate and soluble casein. Instead of using these various milk products separately and mixing them with ground cheese, some whole or skim-milk can be evaporated together with the whey, thus producing a whey concentrate containing these various ingredients in suitable proportions. On being heated these constituents form a colloidal combination. The concentrate may be mixed with any kind or variety of ground cheese. The product obtained is an improvement over the usual all cheese processed cheese as the taste of the cheese is improved and it contains valuable constituents not present in the cheese itself and it is an improvement of the product of the Eldredge patent above mentioned in that the texture is improved.

The semi-soluble colloidal casein content may also be formed partly of skim-milk in condensed or powdered form and partly of whole milk in condensed or powdered form to bring about the improvements mentioned without departing from the invention.

In using the milk products for the purposes outlined above, it should be borne in mind that they are carriers for the water soluble vitamines of the milk and that in substituting part of the whey with either of them I have not materially decreased the amounts of these vitamines present in the finished products.

What I claim as my invention is:

1. A new food product consisting of cured cheese, added whey concentrate and semi-soluble colloidal milk casein, the cured cheese being substantially free of putrefactive bacteria and the lactose of the whey and milk casein being fixed against lactic acid fermentation.

2. A new food product consisting of cured cheese, added whey concentrate and semi-soluble colloidal milk casein obtained from skim-milk in condensed or powdered form, the cured cheese being substantially free of putrefactive bacteria and the lactose of the whey and milk casein being fixed against lactic acid fermentation.

3. A new food product consisting of cured cheese, added whey concentrate and semi-soluble colloidal milk casein obtained from whole milk in condensed or powder form, the cured cheese being substantially free of putrefactive bacteria and the lactose of whey and milk casein being fixed against lactic acid fermentation.

4. The process of making a food product which comprises neutralizing whey, concentrating the neutralized whey to form a concentrate of pasty consistency when cold, mixing the concentrate with semi-soluble colloidal milk casein and ground cheese, and heating the mixture to a pasteurizing temperature.

FELIX M. FREDERIKSEN.